(12) United States Patent
Uchida et al.

(10) Patent No.: US 8,116,217 B2
(45) Date of Patent: Feb. 14, 2012

(54) WIRELESS COMMUNICATION APPARATUS, METHOD AND PROGRAM STORAGE MEDIUM

(75) Inventors: Shigenori Uchida, Kanagawa (JP); Katsutoshi Itoh, Tokyo (JP); Noboru Oki, Saitama (JP); Osamu Yoshimura, Kanagawa (JP); Masahiko Naito, Tokyo (JP)

(73) Assignee: Sony Corporation, Tokyo (JP)

( * ) Notice: Subject to any disclaimer, the term of this patent is extended or adjusted under 35 U.S.C. 154(b) by 944 days.

(21) Appl. No.: 12/121,543

(22) Filed: May 15, 2008

(65) Prior Publication Data
US 2008/0285514 A1   Nov. 20, 2008

(30) Foreign Application Priority Data

May 15, 2007 (JP) ................................. 2007-129520
Mar. 4, 2008 (JP) ................................. 2008-053134

(51) Int. Cl.
*G08C 15/00* (2006.01)
(52) U.S. Cl. ......... 370/252; 370/329; 455/509; 455/522
(58) Field of Classification Search .................... None
See application file for complete search history.

(56) References Cited

U.S. PATENT DOCUMENTS

| 7,369,981 B1* | 5/2008 | Saghier et al. .................. 703/22 |
| 2006/0019672 A1* | 1/2006 | Kolding et al. ............. 455/452.2 |
| 2006/0209712 A1* | 9/2006 | Morioka et al. .............. 370/252 |
| 2007/0195736 A1* | 8/2007 | Taira et al. .................... 370/335 |
| 2008/0298306 A1* | 12/2008 | Larsson ........................ 370/328 |

* cited by examiner

*Primary Examiner* — Chi H. Pham
*Assistant Examiner* — Shick Hom
(74) *Attorney, Agent, or Firm* — Finnegan, Henderson, Farabow, Garrett & Dunner, L.L.P.

(57) ABSTRACT

A wireless communication apparatus having a wireless communication function capable of using a plurality of transmission rates. The wireless communication apparatus includes utilization-factor calculation section for calculating a utilization factor of a wireless transmission path through which wireless communication is performed using the wireless communication function and determination section for determining a transmission rate at least on the basis of the utilization factor calculated by the utilization-factor calculation section.

9 Claims, 14 Drawing Sheets

PRIOR ART

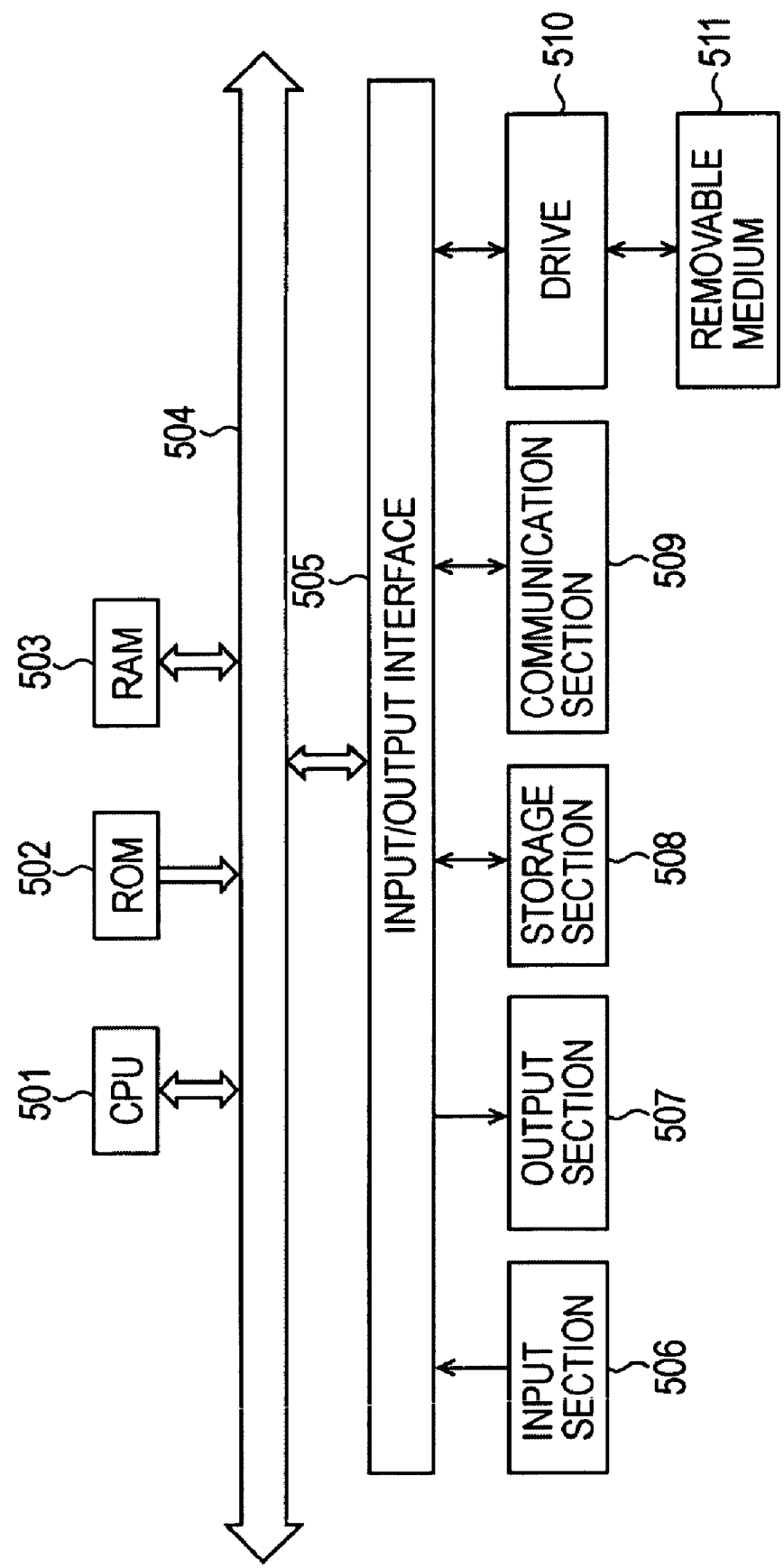

WIRELESS COMMUNICATION APPARATUS, METHOD AND PROGRAM STORAGE MEDIUM

CROSS REFERENCES TO RELATED APPLICATIONS

The present invention contains subject matter related to Japanese Patent Application JP 2007-129520 and JP 2008-053134 filed in the Japanese Patent Office on May 15, 2007 and Mar. 4, 2008, respectively, the entire contents of which are incorporated herein by reference.

BACKGROUND OF THE INVENTION

1. Field of the Invention

The present invention relates to a method, an apparatus, and a program storage medium storing a program for wireless communication. More particularly, the present invention relates to a method for determining a transmission rate in accordance with the transmission quality of a wireless transmission path in wireless communication capable of selectively using a plurality of transmission rates, and to a wireless communication apparatus and a program storage medium storing a program for carrying out this method.

2. Description of the Related Art

In recent years, wireless networks, such as a wireless LAN (Local Area Network) as represented by the IEEE (The Institute of Electrical and Electronics Engineers, Inc.) 802.11, etc., are being widespread in place of wired networks, because of having advantages, such as a higher degree of freedom in the installation locations of apparatuses. Also, various types of applications, such as applications handling a large volume of data, for example images, etc., have come to make frequent accesses to a network. As a result, a high transmission rate is demanded for a wireless LAN, and thus further improvement in throughput is requested.

In order to achieve such an object, IEEE802.11 makes it possible to use a plurality of transmission rates in a physical layer (PHY layer), and to select a best suited communication rate in accordance with changes in the actual communication environment (This transmission rate control is called link adaptation). For example, if the actual communication environment is changing as shown in FIG. 1 (refer to a dashed line in the figure), the transmission rate used in the network is changed so as to meet the actual communication environment (refer to a solid line in the figure).

As a result, for example, when a transmission state of a wireless transmission path (in the following, simply called "transmission quality") is favorable, a high transmission rate is selected to achieve high throughput, whereas if the transmission quality is not favorable, a low transmission rate (that is to say, an error-resistant transmission rate) is selected. Accordingly, the reachability of transmission data improves, and thus the throughput per unit time (the amount of transmission information) improves. In this regard, each transmission rate is achieved by the combination of a modulation method in accordance with the transmission rate, the redundancy (the number of antennas in the case of a communication system using MIMO (Multiple Input Multiple Output) such as EWC, WiMAX, etc.), and the like.

Here, the transmission path quality to be a selection criterion at the time of selecting a transmission rate can be estimated by various kinds of parameters. For example, a proposal has been made of a system in which the transmission path quality is estimated, for example, in accordance with the retransmission state of packets to determine a transmission rate (refer to Japanese Unexamined Patent Application Publication No. 2004-328652).

FIG. 2 illustrates a configuration of a related-art wireless communication system which determines a transmission rate in accordance with a retransmission state. FIG. 3 illustrates an example of a configuration of an AP 1 included in that system.

In the related-art wireless LAN system, under the control of the AP 1, a BSS (Base Service Set) is formed by the AP 1 and one or more STAs 2-1, 2-2, . . . , 2-n (in the following, called STA 2 in the case where it is not necessary to make a distinction individually). The communication between each of the STAs 2 is achieved through the AP 1 (in the infrastructure mode).

The AP 1 (FIG. 3) forming the BSS includes MAC circuits 11 and 18, PHY circuits 12 and 17, RF circuits 13 and 16 corresponding to Tx (transmission) and Rx (receiving), respectively. In the circuit group of the Tx side, the MAC circuits 11 and the PHY circuits 12 perform processing corresponding to a MAC layer and a PHY layer, respectively on the data supplied from an upper layer 19. As a result, the signal corresponding to the data is up-converted by the RF circuit 13, and is output from an antenna 14. At the same time, in the Rx side, the signal received by an antenna 15 is down-converted by the RF circuit 16, then is subjected to processing corresponding to the PHY layer and the MAC layer in the PHY circuit 17 and the MAC circuit 18, respectively, and is supplied to the upper layer 19.

The retransmission control of a data packet is performed by the Tx-side MAC circuit 11, and the transmission rate used for communication is also determined by the MAC circuit 11 together with the retransmission control. In this regard, the method of retransmission control by the MAC circuit 11 is defined by IEEE802.11. Depending on whether the transmission side has received an ACK packet corresponding to a data packet to be transmitted, a determination is made on whether it is necessary to retransmit the data packet.

A specific configuration of the MAC circuit 11 achieving such a function is shown in FIG. 4.

When a packet transmission instruction is input into the MAC circuit 11 from the upper layer 19, a packet transmission section 31 supplies the data packet (in the following, called a data packet A), specified by the instruction, which is held in a data buffer 32, to the PHY circuit 12.

At this time, the packet transmission section 31 supplies the data packet A to the PHY circuit 12, and at the same time, controls a sequence-number management section 33 in order to add a sequence number W to the data packet A to be transmitted, which is held in the data buffer 32.

Also, the packet transmission section 31 outputs a packet transmission signal indicating that a data packet has been transmitted to a transmission-rate determination section 22 at the time of transmission of a packet.

After the packet transmission section 31 transmitted the data packet A, an ACK receiving section 34 becomes an ACK-packet waiting state, that is to say, a state of waiting for an ACK packet flag indicating that an ACK packet for the transmitted data packet A, supplied from the MAC circuit 18, has been received. In this state, when the ACK receiving section 34 receives the ACK packet flag, it is determined that the data packet A has reached the receiving side, and thus the data packet with the sequence number W is deleted from the data buffer 32.

On the other hand, if the ACK packet flag has not been received, the ACK receiving section 34 informs the packet transmission section 31 of that, and the packet transmission section 31, which has received that information, supplies the data packet A held in the data buffer 32 to the PHY circuit 12 again. At this time, the packet transmission section 31 outputs a packet retransmission signal, which indicates that the retransmission of the data packet has been done, to the transmission-rate determination section 22.

At the same time, in the transmission-rate determination section 22, a packet-retransmission count signal output section 51 performs the following processing.

1. When a packet retransmission signal is supplied from the transmission control section 21 (the packet transmission section 31 thereof), the packet-retransmission count signal output section 51 supplies a packet-retransmission count signal to a number-of-packet-retransmission holding section 53.

2. When a packet transmission signal is supplied from the transmission control section 21 (the packet transmission section 31 thereof), the packet-retransmission count signal output section 51 supplies a packet-transmission count signal to a number-of-packet-transmission holding section 54.

In this manner, when either count signal is supplied from the packet-retransmission count signal output section 51, the number-of-packet-retransmission holding section 53 counts the number (Y) of transmitted data packets and the number (X) of times of data-packet retransmission during a sampling period for the determination of a rate, and supplies the numbers to an error-rate calculation section 55.

As a result, in the error-rate calculation section 55, an error rate is calculated by dividing the number (X) of times of data-packet retransmission by the number (Y) of times of data-packet transmission.

A transmission-rate determination section 56 compares the error rate supplied from the error-rate calculation section 55 and a threshold value held in a threshold-value holding section 57, determines a transmission rate on the basis of the comparison result, and supplies a predetermined rate information signal to the PHY circuit 12.

Specifically, if the error rate is greater than a predetermined threshold value D, the transmission-rate determination section 56 assumes that errors occur because the transmission rate being used currently is aggressive compared with the transmission state of the wireless transmission path. Thus, the transmission-rate determination section 56 determines to lower the transmission rate less than the current transmission rate, and supplies the rate information signal indicating that to the PHY circuit 12.

Also, if the error rate is less than a predetermined threshold value U, the transmission-rate determination section 56 assumes that a higher transmission rate than the transmission rate currently being used can be used. Thus, the transmission-rate determination section 56 determines to raise the transmission rate, and supplies the rate information signal indicating that to the PHY circuit 12.

Furthermore, if the error rate is in the rage of the threshold value U to the threshold value D, the transmission-rate determination section 56 determines that the transmission rate currently being used is appropriate, and supplies the rate information signal indicating that the transmission rate is maintained to the PHY circuit 12. As a result, in the PHY circuit 12, the transmission rate is changed in accordance with the rate information signal supplied from the MAC circuit 11. That is to say, the modulation method of the data packets supplied from the MAC circuit 11 is changed.

In this regard, here, the raising and the lowering of the transmission rate may be carried out by each one phase (for example, the raising from 12 Mbps to 18 Mbps), or may be carried out by two phases or more at once (for example, from 12 Mbps to 24 Mbps).

SUMMARY OF THE INVENTION

As described above, in the related-art method, the transmission state of a wireless transmission path, that is to say, the reachability of a data packet is determined by whether an ACK packet has been received or not, that is to say, whether there is retransmission of a data packet or not. However, the causes of a data packet not reaching the receiving side, that is to say, the cause of the retransmission of a data packet are as follows. One of the causes is that an inappropriate transmission rate is used for the transmission quality of the wireless transmission path (the current transmission rate is greater than the transmission rate that is virtually possible in the current situation of the wireless transmission path). The other of the causes is that the data packet does not reach the receiving side because of the collision with a data packet transmitted from the other STA 2.

However, in the related-art method, the causes of retransmission of data packets are not considered.

Accordingly, if an appropriate transmission rate is used with respect to the transmission quality of a wireless transmission path, when a data packet is retransmitted by the collision with another packet, the transmission rate is assumed to be too aggressive. Thus, a determination is made to lower the transmission rate. That is to say, in the related-art method, for example, a wireless transmission path which can be used originally has sometimes failed to be effectively used.

The present invention has been made in view of these circumstances. It is desirable to make it possible to use a transmission rate in accordance with the transmission quality of a wireless transmission path.

According to an embodiment of the present invention, there is provided a wireless communication apparatus having a wireless communication function capable of using a plurality of transmission rates, including: utilization-factor calculation means for calculating a utilization factor of a wireless transmission path through which wireless communication is performed using the wireless communication function; and determination means for determining a transmission rate at least on the basis of the utilization factor calculated by the utilization-factor calculation means.

With this configuration, the utilization factor of the wireless transmission path is considered at the time of determination of a transmission rate. Normally, if a method of determining a transmission rate in accordance with only various kinds of parameters, such as the number of times of retransmission, is adopted, it is not possible for an STA or an AP to identify whether the transmission quality is actually deteriorated, or transmission errors occur because of the occurrence of packet collisions due to the congestion of the wireless transmission path. On the other hand, the collision rate of packets is assumed to be dependent on the utilization factor of the wireless transmission path. If the utilization factor is high, the probability becomes very high that the cause of the transmission errors is the collisions of packets. Thus, it becomes possible to select a transmission rate reflecting the actual environment (that is to say, the quality of the transmission path) by taking the utilization factor of the wireless transmission path into consideration.

In this regard, the determination means may calculate a data retransmission rate on the basis of a number of times of data retransmission performed in a state where the calculated utilization factor is lower than a threshold value, and may determine the transmission rate on the basis of the calculated retransmission rate. Furthermore, in this case, the determination means may calculate the retransmission rate by excluding, from a number of times of actual retransmission, a number of times of data retransmission performed in a state where the calculated utilization factor is greater than the threshold value.

Furthermore, the communication standard to which the wireless communication apparatus conforms is arbitrary. The wireless communication apparatus can employ various kinds of communication methods defining a rate adaptation function, for example, IEEE802.11, WiMAX, LTE, etc.

Moreover, the utilization-factor calculation means may calculate a used time in which the wireless transmission path is used in a predetermined measuring time, and may calculate the utilization-factor by dividing the calculated used time by the measuring time. The method of calculating a used time at this time is arbitrary. For example, the utilization-factor calculation means may calculate the used time using a Duration value in a MAC header constituting a data packet, or a LENGTH value and a RATE value in a PHY header, or a signal strength value of a receiving signal.

Also, the utilization-factor calculation means may calculate the used time using channel information included in an information element constituting a received management packet.

According to an embodiment of the present invention, there is provided a method of wireless communication in a wireless communication apparatus having a wireless communication function capable of using a plurality of transmission rates, or a program storage medium storing a program for causing a computer to perform wireless communication processing having a wireless communication function capable of using a plurality of transmission rates, the method or the processing including the steps of: calculating a utilization factor of a wireless transmission path through which wireless communication is performed using the wireless communication function; and determining a transmission rate at least on the basis of the utilization factor calculated by the step of calculating the utilization factor.

In a wireless communication apparatus, a wireless communication method, or a program storage medium storing a program according to an embodiment of the present invention, the utilization factor of the wireless transmission path through which wireless communication is performed by a wireless communication function is calculated, and a transmission rate is determined on the basis of at least the calculated utilization factor.

By the present invention, it is possible to use a transmission rate in accordance with the transmission state of a wireless transmission path.

BRIEF DESCRIPTION OF THE DRAWINGS

FIG. 14 is a block diagram illustrating an example of a configuration of a computer.

DESCRIPTION OF THE PREFERRED EMBODIMENTS

In the following, a description will be given of embodiments of the present invention. The relationship between the constituent features of the present invention and the embodiment described in this specification or the drawings is exemplified as follows. This description is for confirming that an embodiment supporting the present invention is included in the specification or the drawings. Accordingly, if there is an embodiment included in the specification or the drawings, but not included here as an embodiment corresponding to the constituent features of the present invention, the fact does not mean that the embodiment does not correspond to the constituent features of the invention. On the contrary, if an embodiment is included here as constituent features corresponding to the present invention, the fact does not mean the embodiment does not correspond to the constituent features other than that constituent feature.

Figure 1:
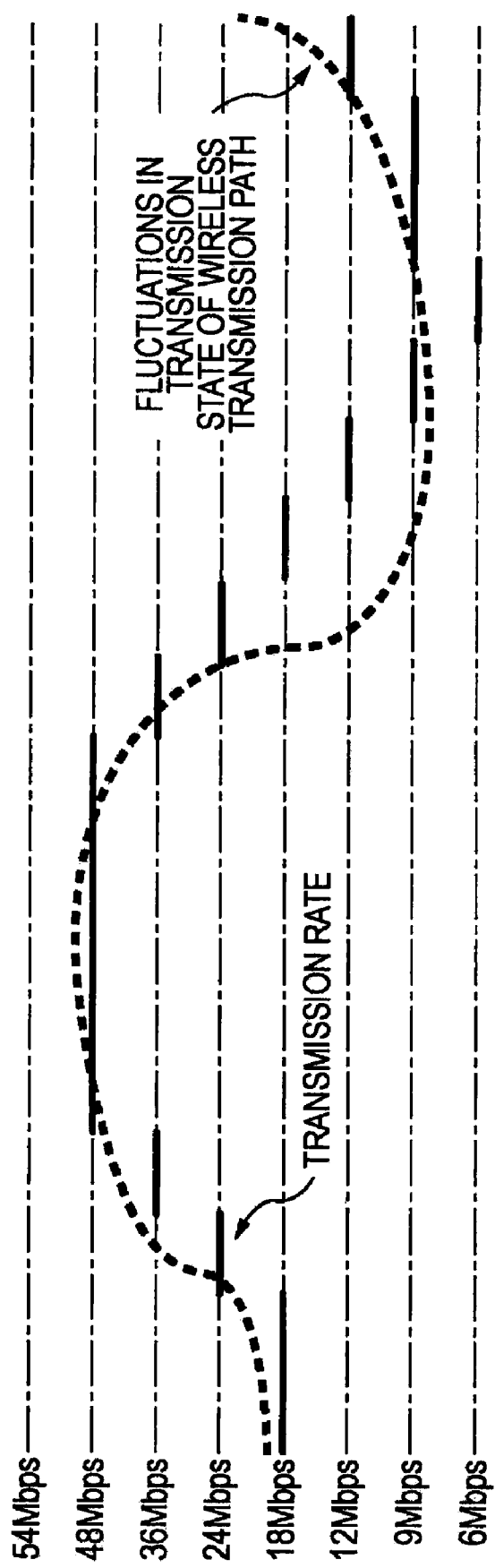
FIG. 1 is a diagram illustrating transition of transmission rates.
Figure 2:
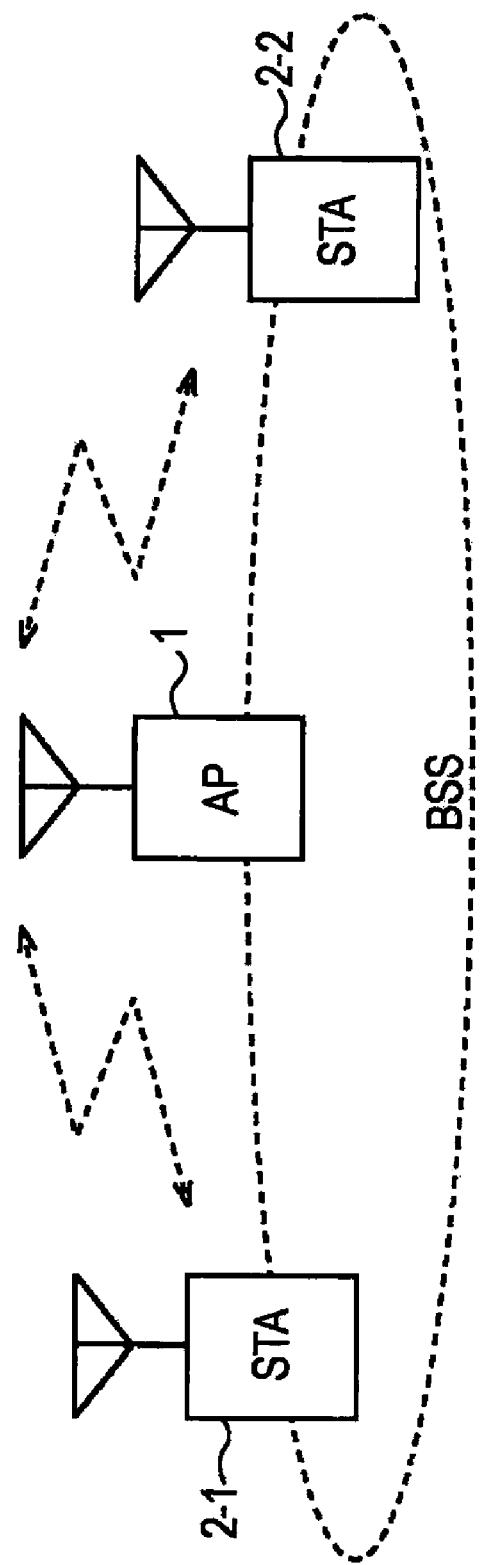
FIG. 2 is a block diagram illustrating an example of a configuration of a related-art wireless LAN system.
Figure 5:
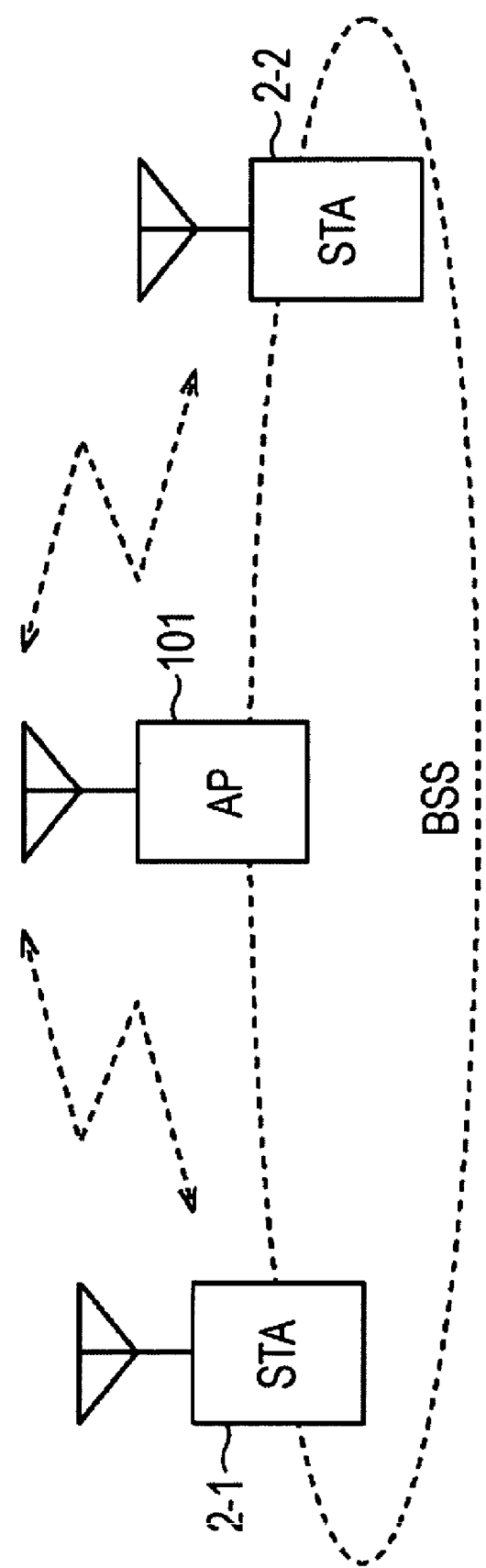
FIG. 5 is a block diagram illustrating an example of a configuration of a wireless LAN system to which the present invention is applied.

FIG. 5 is illustrates an example of a configuration of a wireless LAN system to which the present invention is applied. In this LAN system, an AP 101 is provided in place of the AP 1 of FIG. 2. The other parts are the same as the case of FIG. 2.

That is to say, this wireless LAN system also conforms to IEEE802.11, and has a configuration in which the AP 101 and a plurality of STAs 2-1, 2-2, . . . , 2-$n$ (STAs 2-3 to 2-$n$ are omitted to be shown in the figure) are connected by a wireless network. In the physical layer of the system, a plurality of transmission rates are provided. In IEEE802.11b, four kinds of transmission rates, 1 Mbps, 2 Mbps, 5.5 Mbps, and 11 Mbps, are provided. In IEEE802.11a/g, eight kinds of transmission rates, 6 Mbps, 9 Mbps, 12 Mbps, 18 Mbps, 24 Mbps, 36 Mbps, 48 Mbps, and 54 Mbps, are provided.

In this regard, in IEEE802.11n, which is in the process of standardization now, a large number of higher transmission rates are scheduled to be provided.

The AP 101 determines a transmission rate on the basis of the utilization factor of the wireless transmission path (for example, a packet-transmission time rate in the wireless transmission path)(in the following, called a medium occupancy rate) in addition to whether there has been retransmission of a data packet by a packet retransmission function at the MAC level defined by IEEE802.11.

As described above, the causes of a data packet not reaching the receiving side are as follows. One of the causes is that an inappropriate transmission rate is used for the transmission quality of the wireless transmission path. The other of the causes is that the data packet does not reach the receiving side because of the collision with a data packet transmitted from the other STA 2. Although the transmission quality is ensured, if a collision of data packets occur, the data packet is retransmitted because of this collision. In this case, in spite of the transmission quality being ensured in reality, the transmission rate is unnecessarily lowered. Thus, a transmission rate not matching the actual communication environment might be selected. Accordingly, in the wireless LAN system according to this embodiment, the probability of the collisions of data packets is detected by the medium occupancy rate, and the transmission-rate control due to the data-packet collisions is prevented as much as possible in consideration of the probability of the data-packet collisions. Thus, a method of determining the transmission rate in accordance with the actual transmission quality is adopted.

In particular, a wireless LAN system like the system that is operated in accordance with IEEE802.11 is provided with a packet-collision protection mechanism by the CSMA/CA method. Accordingly, there is a high correlation between a medium occupancy rate and the probability of data packet collisions, and thus it is expected that the probability of collisions with data packets can be correctly detected by the medium occupancy rate.

Figure 6:
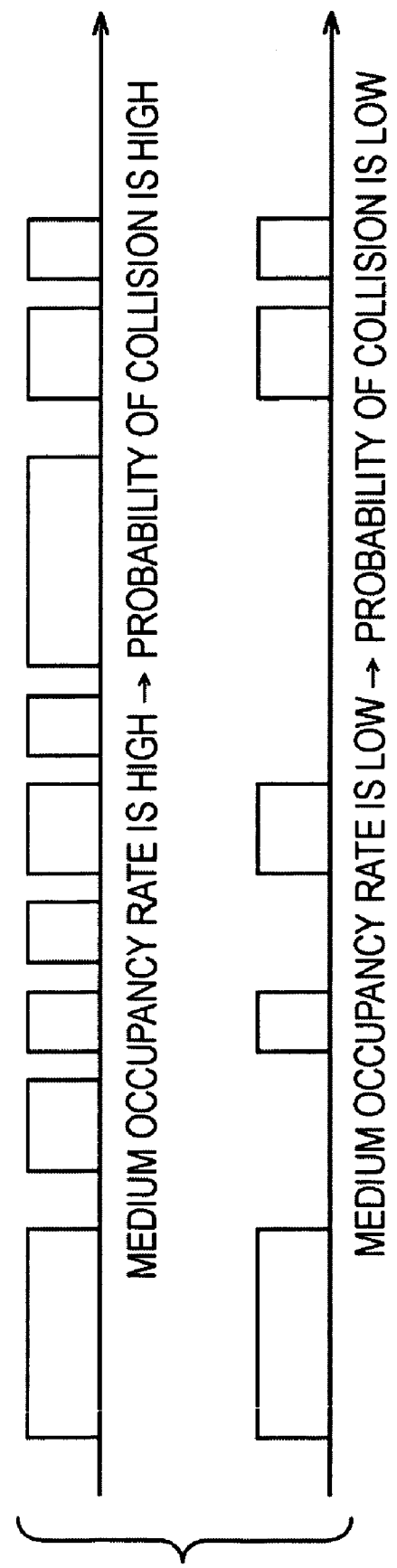
FIG. 6 is a diagram illustrating a relationship between a medium occupancy rate and data packet collisions.

FIG. 6 conceptually illustrates a correlation between a medium occupancy rate and the probability of data packet collisions.

In the CSMA/CA system like IEEE802.11, the acquisition of a medium (that is to say, a wireless transmission path) is carried out by a probabilistic method called random backoff. Thus, STAs 2 and access categories that have acquired the same random backoff value by accident might encounter data packet collisions. That is to say, as shown by the upper part in FIG. 6, if the medium occupancy rate is high, there are many STAs 2 or access categories on the wireless transmission path. Thus, when a data packet is transmitted, the probability that the ACK packet is not returned because of collisions and the data packet is retransmitted becomes high.

On the other hand, as shown by the lower part in FIG. 6, if the medium occupancy rate is low, the probability of the collisions with other data packets is low. Thus, when an ACK packet is not returned, it is highly likely that the cause is a use of an inappropriate transmission rate.

Figure 7:
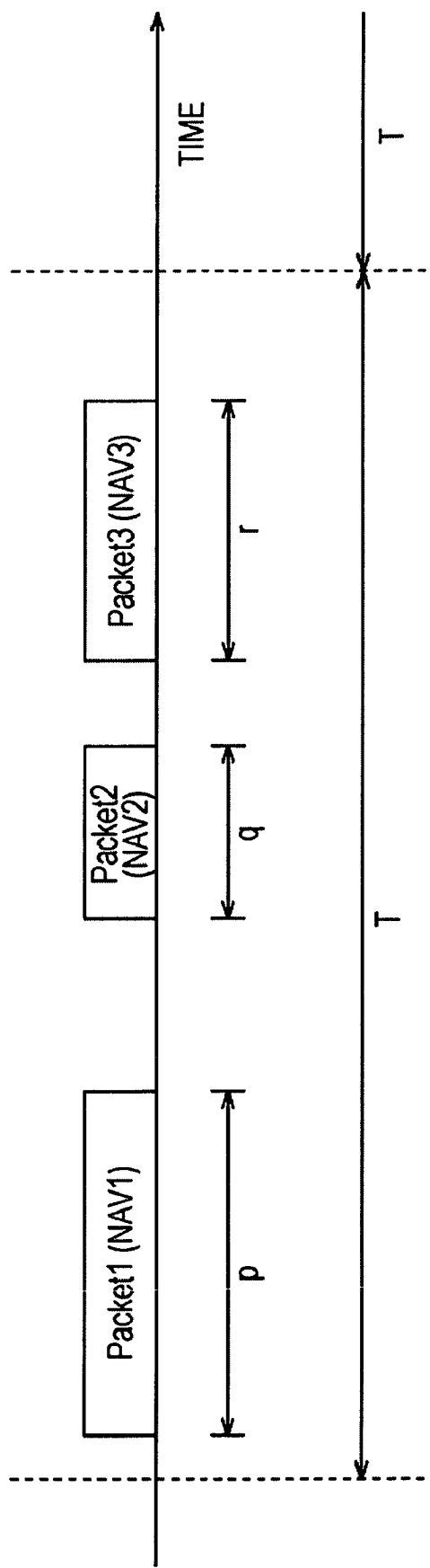
FIG. 7 is a diagram illustrating a medium occupancy rate.

FIG. 7 is a conceptual diagram illustrating a medium occupancy rate using a Duration field value (in the following, called a Duration value) of a MAC header of a data packet.

The Duration value is for the owner of the transmission right defined by IEEE802.11 to set a transmission prohibition section (in the following, called NAV) for the third-party terminal other than a transmission destination, and indicates an occupancy time (that is to say, a time period while the transmission right is acquired) of the wireless transmission path. In this regard, the Duration value is a value acquired by decoding the received data packet as far as the MAC header.

In the example of FIG. 7, Duration values (p, q, and r) of the packets 1, 2, and 3, respectively, received in a certain measuring time T are acquired. The sum value of these values (that is to say, the total time period) is used for a used time (that is to say, an occupancy time period) of the wireless transmission path in the measuring time T. Thus, the medium occupancy rate is obtained by dividing the sum value by the measuring time T (Expression (1)).

$$\text{Medium occupancy rate} = (p+q+r)/T \quad (1)$$

The AP 101 informs the STA 2 of the determined transmission rate by transmitting a notification signal called a beacon in the network (BSS)(in a range of dashed-line frame in FIG. 5).

Figure 3:
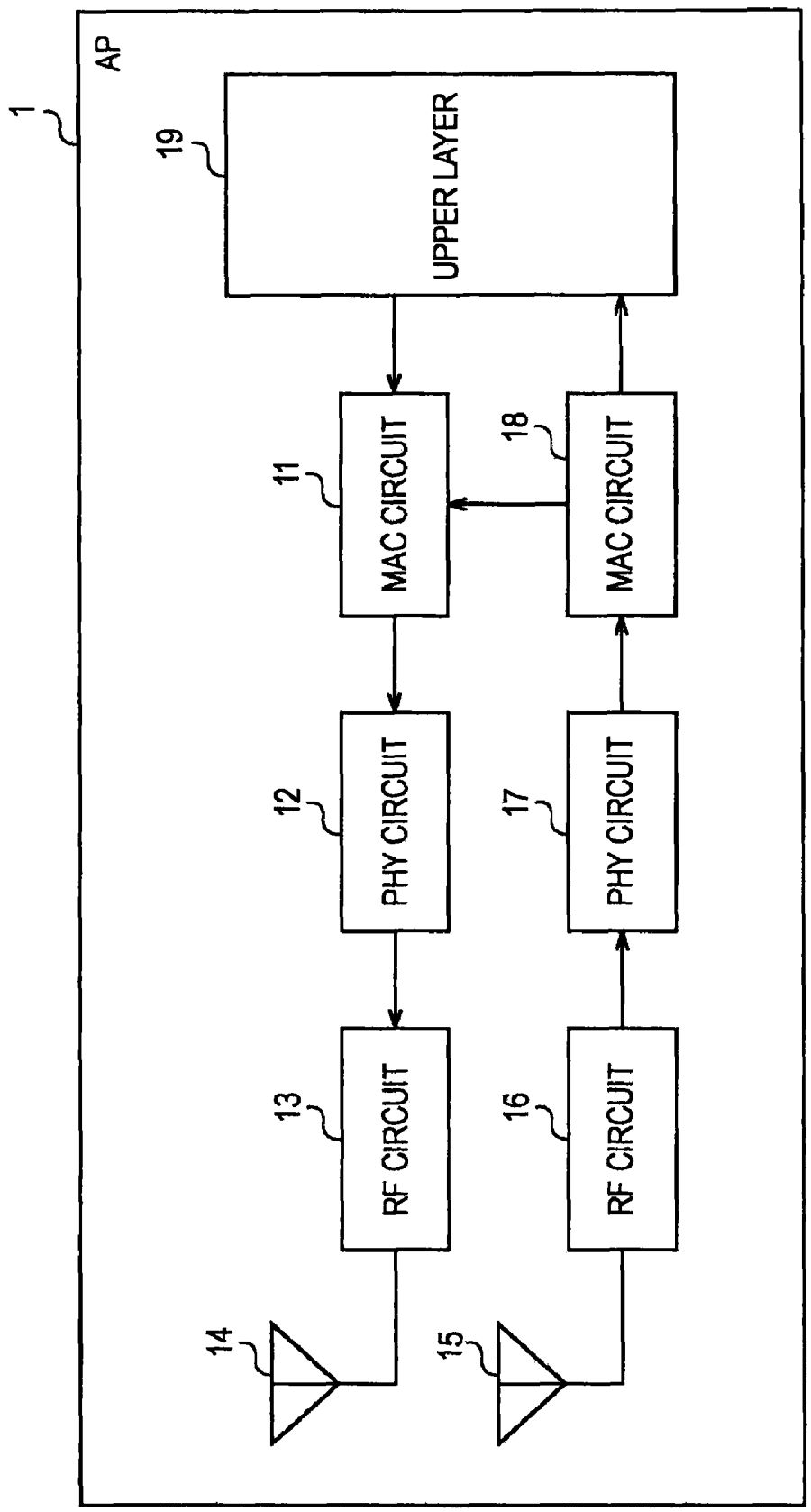
FIG. 3 is a block diagram illustrating an example of a configuration of an AP 1 in FIG. 2.
Figure 8:
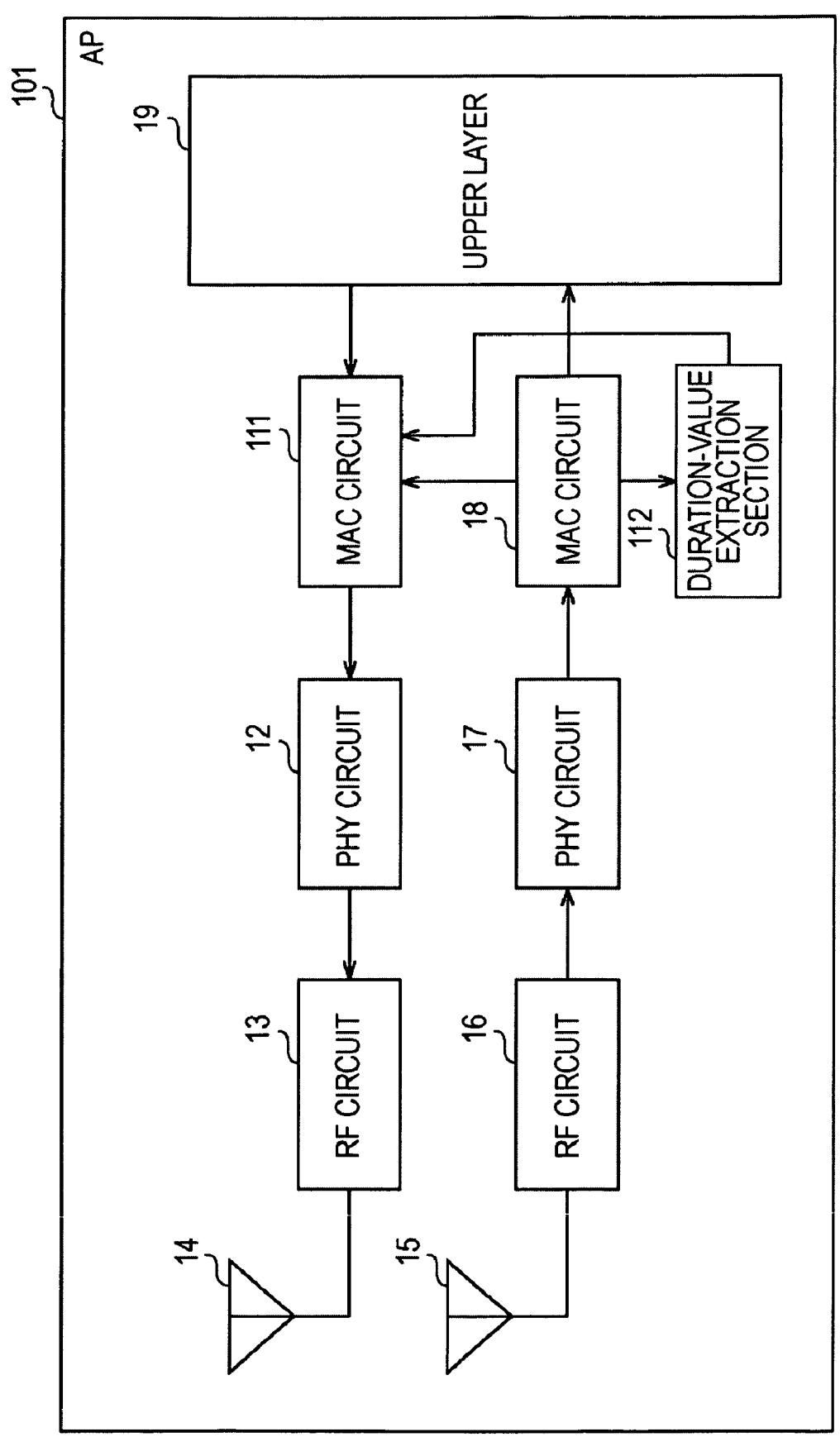
FIG. 8 is a block diagram illustrating an example of a configuration of an AP 101 in FIG. 5.

FIG. 8 illustrates an example of a configuration of the AP 101. The AP 101 is provided with a MAC circuit 111 in place of the MAC circuit 11 of the AP 1 in FIG. 3, and is further provided with a Duration-value extraction section 112. The other parts are the same as those of the AP 1 in FIG. 3, and thus the description thereof will be omitted appropriately.

The Duration-value extraction section 112 extracts the MAC header from the data obtained by the MAC circuit 18 of the Rx side, at the same time, extracts the Duration value from the MAC header, and supplies the extracted Duration value to the MAC circuit 111.

The MAC circuit 111 calculates the medium occupancy rate on the basis of the Duration value supplied from the Duration-value extraction section 112, and determines a transmission rate in accordance with the calculated medium occupancy rate and whether there has been data-packet retransmission.

In this manner, the rate-information signal indicating the determined transmission rate is supplied from the MAC circuit 111 to the PHY circuit 12, and the transmission rate is determined by the PHY circuit 12.

Figure 9:
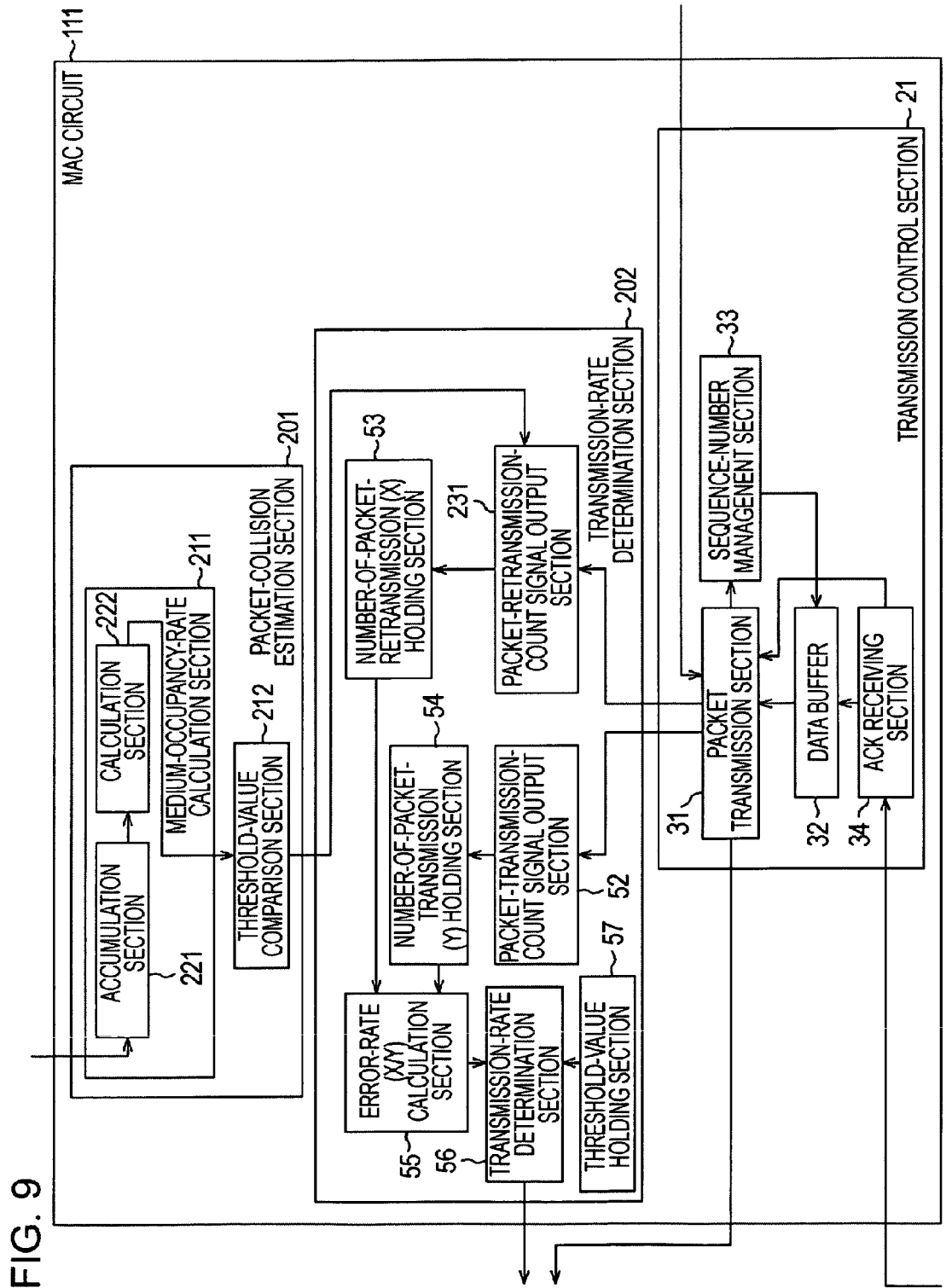
FIG. 9 is a block diagram illustrating an example of a functional configuration of a MAC circuit 111 in FIG. 8.

FIG. 9 illustrates an example of a functional configuration of the MAC circuit 111. In this regard, in FIG. 9, the same reference numeral is attached to the same element as that in FIG. 4. Thus, unless otherwise described, an element having the same reference numeral as each element shown in FIG. 4 has the same configuration and performs the same processing. Also, the "utilization-factor calculation means" in the appended claims corresponds to, for example, a medium-occupancy calculation section 211 in FIG. 9, and the determination means corresponds to, for example, a transmission-rate determination section 202 in FIG. 9.

Figure 4:
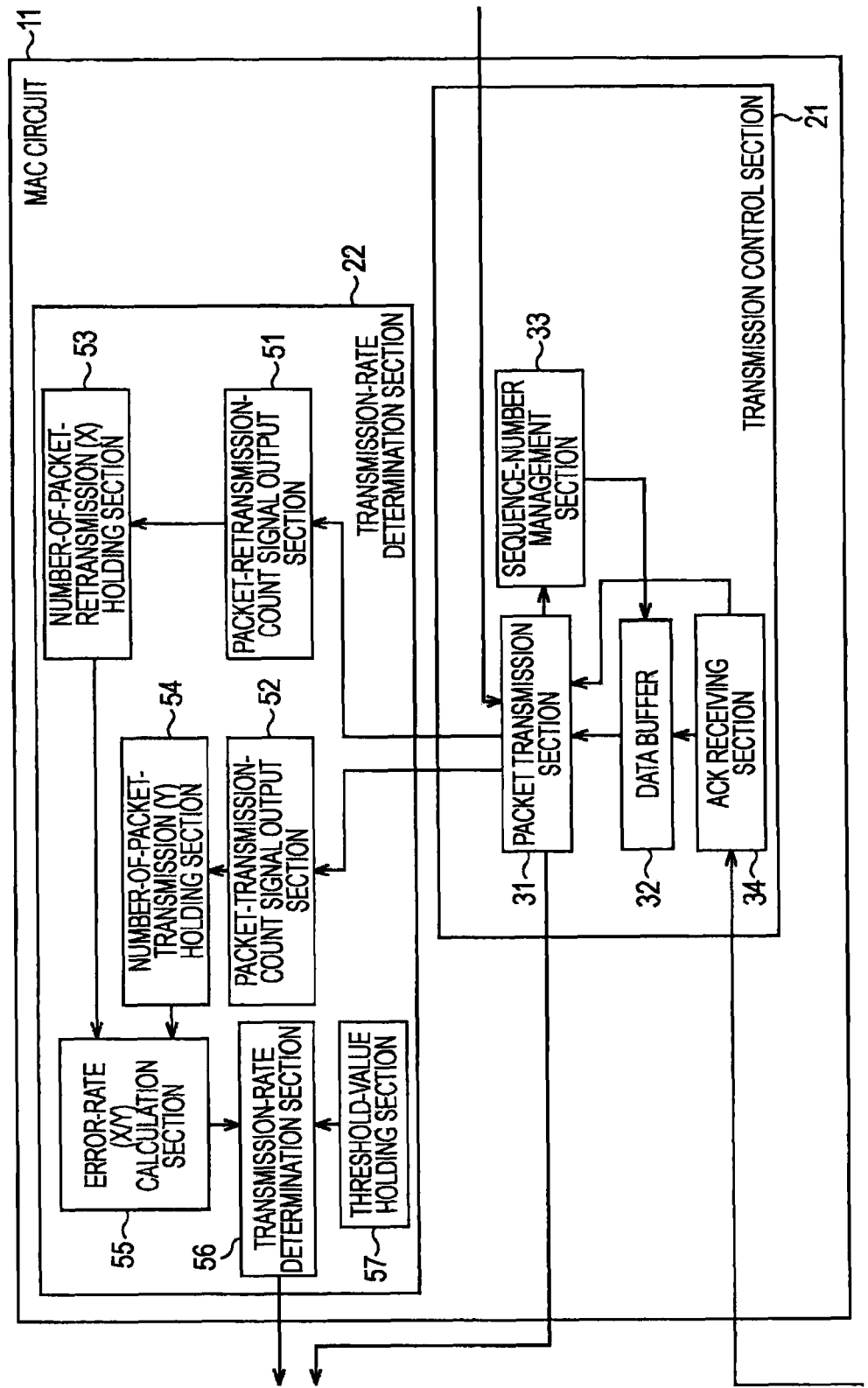
FIG. 4 is a block diagram illustrating an example of a functional configuration of a MAC circuit 11 in FIG. 3.

As shown in FIG. 9, the MAC circuit 111 is provided with the transmission-rate determination section 202 in place of the transmission-rate determination section 22 of the MAC circuit 11 in FIG. 4, and is further provided with a packet-collision estimation section 201.

Among these elements, the packet-collision estimation section 201 calculates the occupancy time of the wireless transmission path during the measuring time T using the Duration value supplied from the Duration-value extraction section 112, and calculates the medium occupancy rate by dividing the occupancy time by the measuring time T (Expression 1).

Also, the packet-collision estimation section 201 detects the probability of data-packet collision on the basis of the calculated medium occupancy rate. If the packet-collision estimation section 201 determines that the probability is high, the packet-collision estimation section 201 supplies a packet-collision estimation signal indicating that fact to the transmission-rate determination section 202.

In order to achieve such a function, the packet-collision estimation section 201 has the medium-occupancy calculation section 211 including an accumulation section 221 and a calculation section 222, and a threshold-value comparison section 212. The accumulation section 221 accumulates the Duration values supplied from the Duration-value extraction section 112 during the measuring time T, and supplies the value obtained as a result (p+q+r in the example in FIG. 7), that is to say, the occupancy time period of the wireless transmission path during the measuring time T to the calculation section 222.

The calculation section 222 calculates the medium occupancy rate by dividing the occupancy time period supplied from the medium-occupancy calculation section 211 by the measuring time T (that is to say, calculates Expression (1)). The calculated medium occupancy rate is supplied to the threshold-value comparison section 212, and is compared with a predetermined threshold value by the threshold-value comparison section 212. As a result of the comparison, if the medium occupancy rate is greater than the threshold value, the threshold-value comparison section 212 determines that the probability of collisions with data packets is high, and supplies the packet-collision estimation signal to the transmission-rate determination section 202.

Next, in the same manner as the transmission-rate determination section 22 in FIG. 4, the transmission-rate determination section 202 calculates an error rate on the basis of the packet-transmission signal and the packet-retransmission signal from the transmission control section 21, and at the same time, determines a transmission rate on the basis of the packet-collision estimation signal supplied from the packet-collision estimation section 201.

In order to achieve these functions, the transmission-rate determination section 202 has a packet-retransmission-count signal output section 231 in addition to the same elements as the individual elements shown in FIG. 4.

In the same manner as the packet-retransmission-count signal output section 51 in FIG. 4, when a packet-retransmission signal is supplied from the transmission control section 21, the packet-retransmission-count signal output section 231 supplies a packet-retransmission-count signal to the number-of-packet-retransmission holding section 53. Here, as described above, if the occurrence of packet retransmission is caused by packet collisions, the setting of the transmission rate based on the retransmission causes a transmission-rate selection not matching the actual communication quality. Accordingly, for the packet retransmission that has occurred during the period when a packet-collision estimation signal is supplied from the transmission-rate determination section 202, it becomes necessary to assume that the retransmission is caused by collisions with other data packets, and to exclude that retransmission from the number of times of retransmission to be a criterion of the transmission rate.

Thus, if a packet-collision estimation signal is supplied from the packet-collision estimation section 201 (that is to say, the cause of retransmission is estimated to be a collision), the packet-retransmission-count signal output section 231 according to this embodiment stops supplying the packet-retransmission-count signal to the number-of-packet-retransmission holding section 53.

As a result, in the error-rate calculation section 55, the number of retransmission times assumed to be caused by collisions is excluded from the number of retransmitted times (X) to be a reference for calculating an error rate, and it becomes possible for the transmission rate determination section 56 to determine a transmission rate matching the actual transmission quality. Thereby, it becomes possible to prevent the occurrence of the transmission-rate changes due to the collisions.

In this regard, the raising and the lowering of the transmission rate here may be carried out by each one phase (for example, the raising from 12 Mbps to 18 Mbps), or may be carried out by two phases or more at once (for example, from 12 Mbps to 24 Mbps).

As described above, by the AP 101 according to this embodiment, the probability of collisions with data packets is detected on the basis of the medium occupancy rate. The data-packet retransmission at the time of having a high probability is excluded from the calculation of the error rate, and thus it becomes possible to determine an appropriate transmission rate in accordance with the actual quality of the transmission path.

Accordingly, if an appropriate transmission rate is used for a transmission quality of a wireless transmission path, when a data packet is retransmitted because of the collision with another data packet, that retransmission is not counted for the calculation of the error rate. Thus, a determination of lowering the transmission rate is not made. That is to say, the wireless transmission path which is originally available can be used effectively.

In this regard, in the above, a description has been given by taking the case of the AP 101 determining the transmission rate as an example. However, the present invention can also be applied to the STA 2. In this case, the present invention can be achieved by the same configuration as the example of the configuration of the above-described AP 1 except that the transmission rate is determined by the STA 2. Thus, the details will be omitted.

Figure 10:
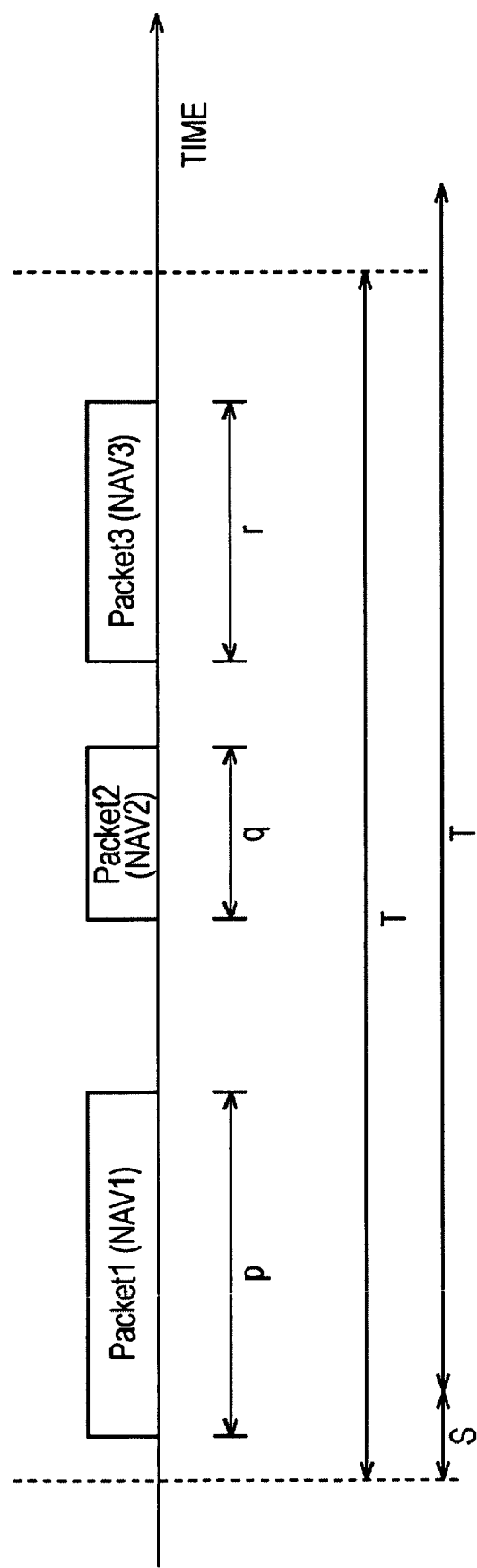
FIG. 10 is another diagram illustrating a medium occupancy rate.

Also, in the above, as shown in FIG. 7, the measuring period is assumed to be a period of each measuring time T. However, as shown in FIG. 10, the measuring period can be determined by shifting a predetermined time period S which is shorter than the measuring time T. That is to say, the measuring period can be determined by the time period with a window width of time T.

Also, in the above, a packet-collision estimation signal is output if the medium occupancy rate exceeds a threshold value one time. However, a packet-collision estimation signal may be output if the medium occupancy rate exceeds a threshold value a predetermined number of times consecutively.

Also, the threshold value to be compared with a medium occupancy rate can be dynamically changed in accordance with the number of STAs 2 registered in the BSS. It is thought that this is because the probability of data-packet collisions increases as the number of registered nodes increases.

Also, if there is an apparatus using a bandwidth of 40 MHz on the adjacent channel, the threshold value to be compared with a medium occupancy rate may be set to, for example, a high number in order to make it difficult to output the packet-collision estimation signal. An apparatus using a bandwidth of 40 MHz sends a beacon of a band of 40 MHz. It is possible to detect that there is an apparatus using a band of 40 MHz by detecting that beacon.

Also, in the above, the occupancy time of the wireless transmission path during the measuring time T is calculated using the Duration value of the MAC header. However, it is possible to decode the LENGTH field and the RATE field in the PHY header of the data packet after the detection of a data packet, then to obtain the packet length (number of bytes) from those values, and to convert the values into a time period using the transmission rate at that time in order to calculate the occupancy time.

Figure 11:
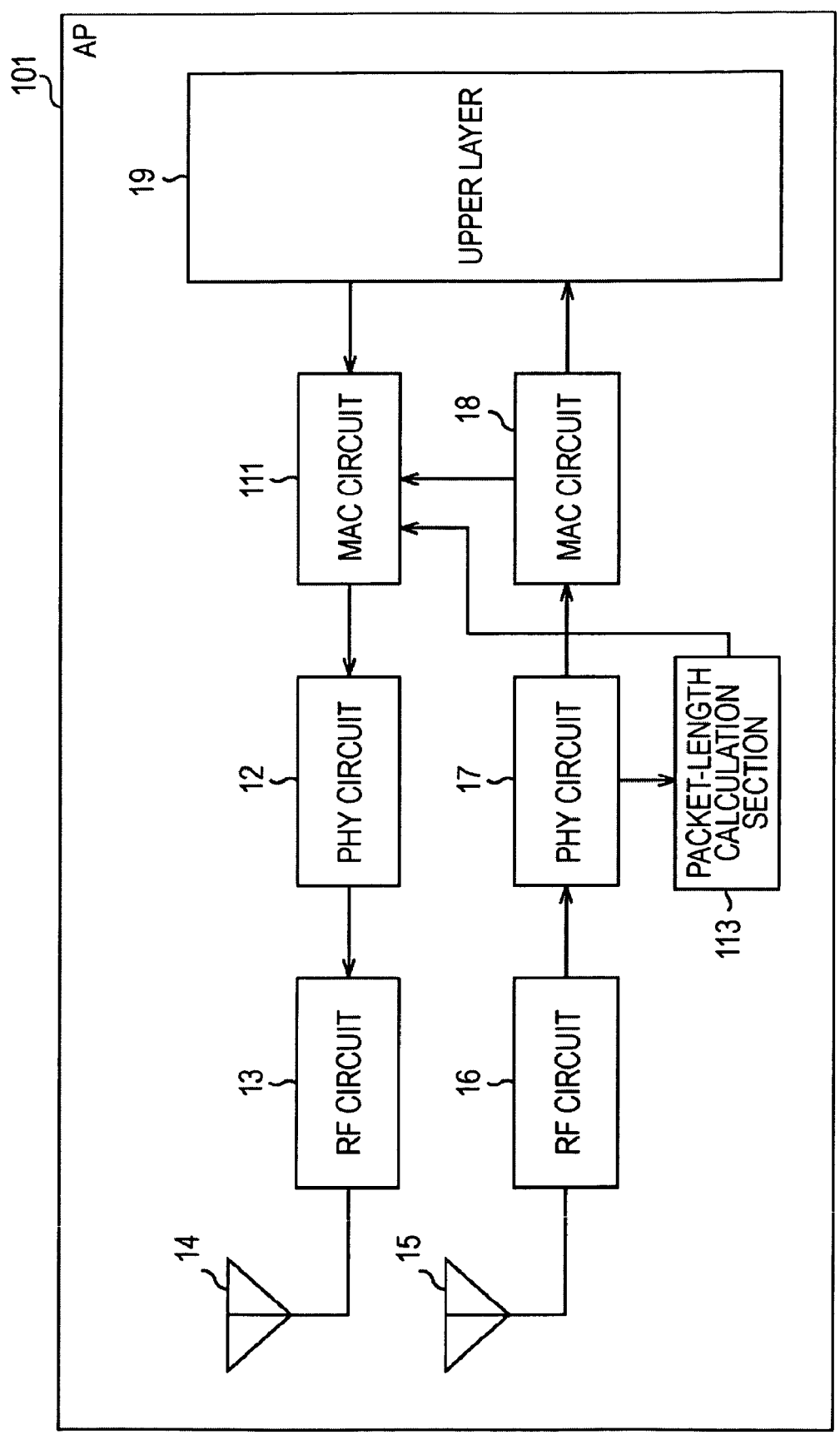
FIG. 11 is a block diagram illustrating another example of a configuration of the AP 101 in FIG. 5.

FIG. 11 illustrates an example of a configuration of an AP 101 when the medium occupancy rate is calculated by calculating the occupancy time from the values of the LENGTH field and the RATE field in the PHY header of a packet. In the AP 101, a packet-length calculation section 113 is provided in place of the Duration-value extraction section 112 of the AP 101 of FIG. 8. The other parts are the same as those of the case in FIG. 8, and thus the description thereof will be appropriately omitted.

The packet-length calculation section 113 extracts the PHY header of the data packet decoded by the PHY circuit 17, and also extracts the values of the LENGTH field and the RATE field (in the following, called the LENGTH value and the RATE value) from the header.

The packet-length calculation section 113 calculates the packet length on the basis of the extracted LENGTH field and RATE field, converts the packet length into a time period by the transmission rate at that time, and supplies the time period to the packet-collision estimation section 201 of the MAC circuit 111.

The time period corresponding to the packet length supplied to the packet-collision estimation section 201 is input into the accumulation section 221 of the medium-occupancy calculation section 211. The accumulation section 221 calculates the occupancy time by accumulating that time during the measuring time T.

As described above, the calculation section 222 and the threshold-value comparison section 212 appropriately supplies the packet-collision estimation signal to the packet-retransmission-count signal output section 231 of the transmission-rate determination section 202.

Also, it is possible to measure the time period when the signal strength of the receiving signal is a certain value or more, and to accumulate that time period to calculate the occupancy time during a measuring time T.

Figure 12:
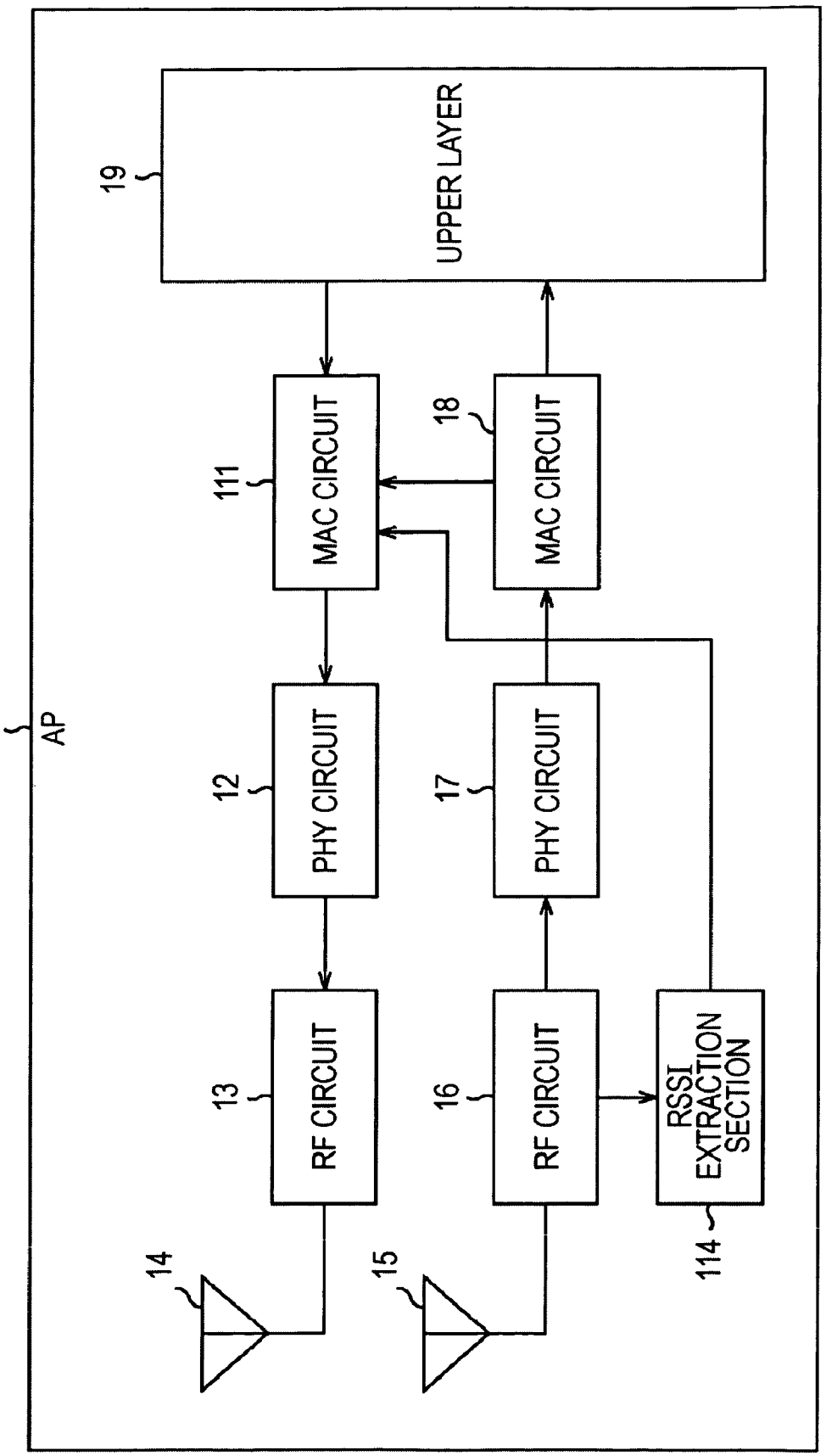
FIG. 12 is a block diagram illustrating another example of a configuration of the AP 101 in FIG. 5.

FIG. 12 illustrates an example of a configuration of an AP 101 when the medium occupancy rate is calculated by calculating the occupancy time from the signal strength. In the AP 101, an RSSI extraction section 114 is provided in place of the Duration-value extraction section 112 of the AP 101 of FIG. 8. The other parts are the same as those of the case in FIG. 8, and thus the description thereof will be appropriately omitted.

The RSSI extraction section 114 extracts an RSSI (Received Signal Strength Indicator) from the received signal input into the RF circuit 16, and supplies it to the MAC circuit 111.

Figure 13:
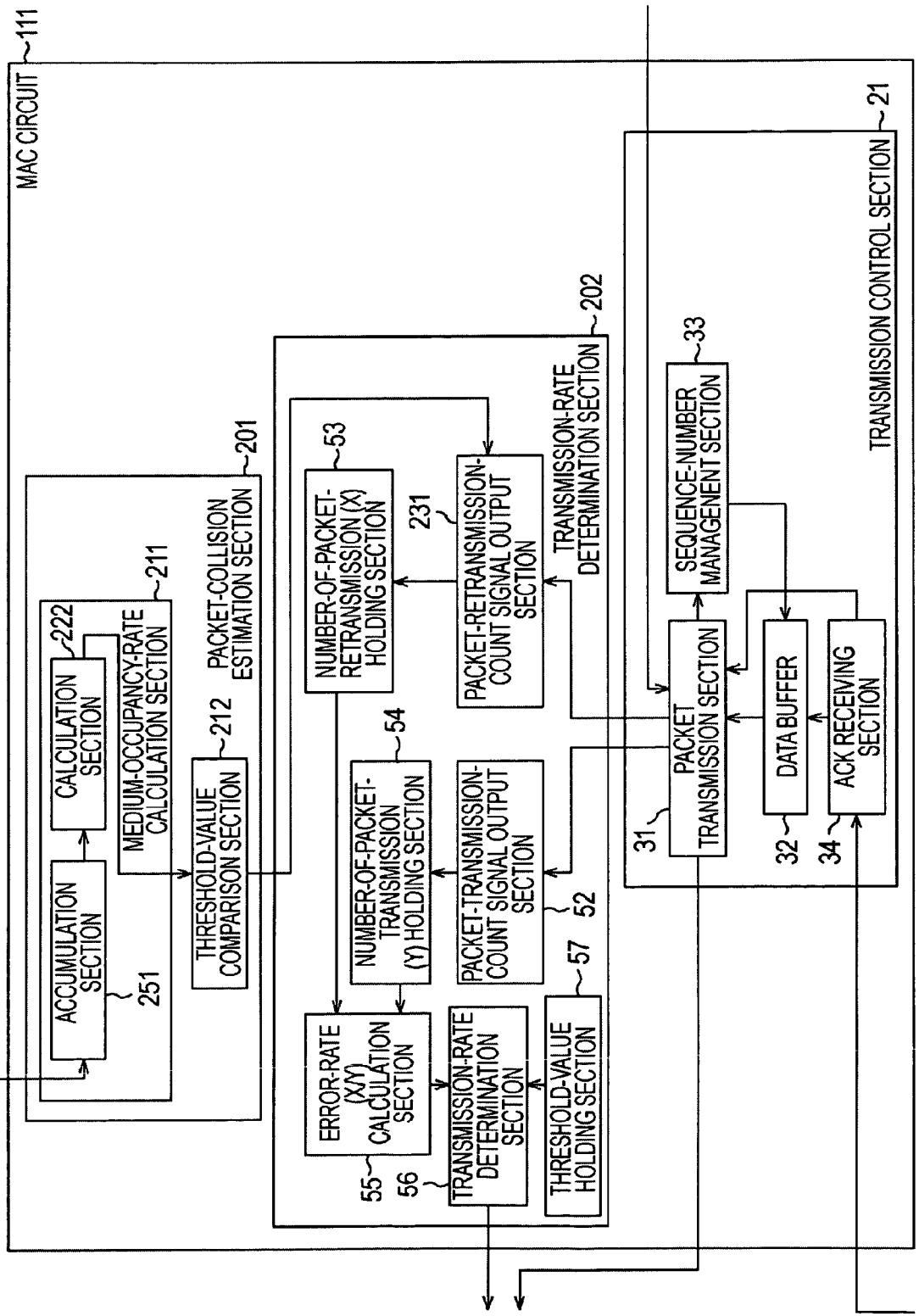
FIG. 13 is a block diagram illustrating an example of a functional configuration of a MAC circuit 111 in FIG. 12.

FIG. 13 illustrates an example of a configuration of a MAC circuit 111 in the case of this example. The packet-collision estimation section 201 of the MAC circuit 111 is provided with the accumulation section 251 in place of the accumulation section 221 in FIG. 9.

The RSSI supplied from the RSSI extraction section 114 is input into the accumulation section 251. The accumulation section 251 compares the RSSI supplied from the RSSI extraction section 114 and a predetermined threshold value. The time period when the RSSI is greater than the threshold value is accumulated during the measuring time T, the occupancy time is calculated in the measuring time T, and the occupancy time is supplied to the calculation section 222.

As described above, the calculation section 222 and the threshold-value comparison section 212 appropriately supplies the packet-collision estimation signal to the packet-retransmission-count signal output section 231 of the transmission-rate determination section 202.

Furthermore, in addition to the embodiments described above, it is possible to use a management packet (Radio Measurement Report) defined in IEEE802.11k which is currently being designed. IEEE802.11k is a standard being designed in order to report the information of the PHY/MAC level as much as possible. An STA (or AP) can request the other STAs (or an AP) to measure and to report the following items, for example.

1. The number of APs on a specified channel or all the channels within the range of that station
2. The strength of the beacon signal of each AP
3. The number of frames received in a specified time period, all the stations that have received the frames, the number of received frames, and the average signal strength of each transmission source
4. The operation level of the wireless LAN in each channel
5. The wireless operations other than the wireless LAN in each channel, which are transmitted from devices, such as cellular phones and microwave ovens which might interfere with 802.11 devices
6. The average of the delay time occurred during the waiting of transmission, the number of failed transmission, statistics, such as the number of FCS errors detected in the received frame
7. The signal length of request-source station measured by the request-destination station.
8. The positions of the other stations
9. The frame statistics information of the PHY level (for example, received power, the number of used antennas and the used antenna numbers, the PHY Type, etc.)
10. BSS establishment information (for example, a TSF counter value, a BSSID, Vendor information, etc.) of adjacent APs The above measurement result is shared among STAs described in a management packet, or among APs and STAs. Among the IE (Information Elements) corresponding to the measurement result, the following indicate the number of STAs existent on a channel and the Busy rate, and thus it becomes possible to determine the medium occupancy time T using these IEs.

a. Channel Load (IE indicating CCA busy-time-rate statistics)
b. Noise Histogram (IE indicating received power during NAV, that is to say, the existence probability of STA)

Also, c. STA Statistics (IE indicating a transmission and receiving packet counter, and a retransmission counter) is applicable to calculate the error rate of packets.

Accordingly, it is possible to achieve the selection of an appropriate transmission rate by using these IEs included in the management packet.

Moreover, the above-described series of processing can be executed by hardware or can be executed by software. When the series of processing is executed by software, the programs constituting the software are built in a dedicated hardware of a computer. Alternatively, the various programs are installed, for example in a general-purpose personal computer capable of executing various functions from a program-recording medium.

FIG. 14 is a block diagram illustrating an example of a configuration of computer hardware performing the above-described series of processing.

In the computer, a CPU (Central Processing Unit) 501, a ROM (Read Only Memory) 502, a RAM (Random Access Memory) 503 are mutually connected by a bus 504.

An input/output interface 505 is also connected to the bus 504. An input section 506 including a keyboard, a mouse, a microphone, etc., an output section 507 including a display, a speaker, etc., a storage section 508 including a hard disk, a nonvolatile memory, etc., a communication section 509 including a network interface, etc., and a drive 510 for driving a removable medium 511, such as a magnetic disk, an optical disc, a magneto-optical disc, or a semiconductor memory, etc., are connected to the input/output interface 505.

In the computer having the configuration as described above, the CPU 501 loads the program stored, for example in storage section 508 to the RAM 503 through the input/output interface 505 and the bus 504 to execute the program, thereby the above-described series of processing is performed.

The program to be executed by the computer (CPU 501) is recorded in a removable medium 511, which is a package medium including, such as a magnetic disk (including a flexible disk), an optical disc (including a CD-ROM (Compact Disc-Read Only Memory), a DVD (Digital Versatile Disc), etc.), a magneto-optical disc, or a semiconductor memory, etc. Alternatively, the program may be provided through wired or wireless transmission, such as a local area network, the Internet, a digital satellite broadcasting, etc.

The program can be installed in the storage section 508 through the input/output interface 505 by attaching the removable medium 511 to the drive 510. Also, the program can be received by the communication section 509 through wired or wireless transmission and be installed in the storage section 508. In addition, the program may be pre-installed in the ROM 502 or the storage section 508 in advance.

In this regard, the program executed by the computer may be the program that is processed in time series in accordance with the described sequence in this specification. Also, the programs may be the programs to be executed in parallel or at necessary timing, such as at the time of being called, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus having a wireless communication function capable of using a plurality of transmission rates, comprising:
    a utilization-factor calculation section for calculating a utilization factor of a wireless transmission path through which wireless communication is performed using the wireless communication function; and
    a determination section for determining a transmission rate at least on the basis of the utilization factor calculated by the utilization-factor calculation section;
    wherein the determination section calculates a data retransmission rate on the basis of a number of times of data retransmission performed in a state where the calculated utilization factor is lower than a threshold value, and determines the transmission rate on the basis of the calculated retransmission rate.

2. The wireless communication apparatus according to claim 1, wherein the determination section calculates the retransmission rate by excluding, from a number of times of actual retransmission, a number of times of data retransmission performed in a state where the calculated utilization factor is greater than the threshold value.

3. The wireless communication apparatus according to claim 1, wherein the wireless communication function performs wireless communication conforming to IEEE802.11.

4. The wireless communication apparatus according to claim 1, wherein the utilization-factor calculation section calculates a used time in which the wireless transmission path is used in a predetermined measuring time, and calculates the utilization-factor by dividing the calculated used time by the measuring time.

5. The wireless communication apparatus according to claim 4, wherein the utilization-factor calculation section calculates the used time using a Duration value in a MAC header constituting a data packet, or a LENGTH value and a RATE value in a PHY header, or a signal strength value of a receiving signal.

6. The wireless communication apparatus according to claim 3, wherein the utilization-factor calculation section calculates the used time using channel information included in an information element constituting a received management packet.

7. A method of wireless communication in a wireless communication apparatus having a wireless communication function capable of using a plurality of transmission rates, the method comprising the steps of:
    calculating a utilization factor of a wireless transmission path through which wireless communication is performed using the wireless communication function;
    determining a transmission rate at least on the basis of the utilization factor calculated by the step of calculating the utilization factor; and
    calculating a data retransmission rate on the basis of a number of times of data retransmission performed in a state where the calculated utilization factor is lower than a threshold value, and determining the transmission rate on the basis of the calculated retransmission rate.

8. A non-transitory program storage medium storing a computer program for causing a computer to perform wireless communication processing having a wireless communication function capable of using a plurality of transmission rates, the processing comprising the steps of:
    calculating a utilization factor of a wireless transmission path through which wireless communication is performed using the wireless communication function;
    determining a transmission rate at least on the basis of the utilization factor calculated by the step of calculating the utilization factor; and
    calculating a data retransmission rate on the basis of a number of times of data retransmission performed in a state where the calculated utilization factor is lower than a threshold value, and determining the transmission rate on the basis of the calculated retransmission rate.

9. A wireless communication apparatus having a wireless communication function capable of using a plurality of transmission rates, comprising:
    a utilization-factor calculation mechanism for calculating a utilization factor of a wireless transmission path through which wireless communication is performed using the wireless communication function; and
    a determination mechanism for determining a transmission rate at least on the basis of the utilization factor calculated by the utilization-factor calculation mechanism;
    wherein the determination mechanism calculates a data retransmission rate on the basis of a number of times of data retransmission performed in a state where the calculated utilization factor is lower than a threshold value, and determines the transmission rate on the basis of the calculated retransmission rate.

* * * * *